US 6,679,030 B2

(12) United States Patent
Hirschek

(10) Patent No.: US 6,679,030 B2
(45) Date of Patent: Jan. 20, 2004

(54) INSTALLATION FOR TREATING BOTTLES

(75) Inventor: Herwig Hirschek, Bobingen (DE)

(73) Assignee: Autefa Automation GmbH, Friedberg (DE)

(*) Notice: Subject to any disclaimer, the term of this patent is extended or adjusted under 35 U.S.C. 154(b) by 0 days.

(21) Appl. No.: 10/204,484

(22) PCT Filed: Feb. 23, 2001

(86) PCT No.: PCT/EP01/02040
§ 371 (c)(1),
(2), (4) Date: Aug. 19, 2002

(87) PCT Pub. No.: WO01/64007
PCT Pub. Date: Sep. 7, 2001

(65) Prior Publication Data
US 2003/0029140 A1 Feb. 13, 2003

(30) Foreign Application Priority Data

Feb. 29, 2000 (DE) ..................... 200 03 626 U
Sep. 2, 2000 (DE) ..................... 200 15 199 U

(51) Int. Cl.[7] .................................... B65B 35/50
(52) U.S. Cl. ........................... 53/447; 53/540
(58) Field of Search ..................... 53/447, 540

(56) References Cited

U.S. PATENT DOCUMENTS

| 4,373,642 A | | 2/1983 | Wolters et al. |
| 5,086,794 A | * | 2/1992 | Guerinat et al. ......... 134/56 R |
| 5,456,563 A | * | 10/1995 | Halbo ................ 414/416.06 |
| 5,609,451 A | * | 3/1997 | McCorkle, Jr. ............. 410/90 |
| 5,671,856 A | * | 9/1997 | Lisch ................ 220/4.27 |
| 5,673,820 A | * | 10/1997 | Green et al. ............. 222/129.3 |
| 5,769,230 A | * | 6/1998 | Koefelda ................ 206/508 |
| 5,979,654 A | * | 11/1999 | Apps ..................... 206/507 |
| 6,109,857 A | * | 8/2000 | Trygg ................... 414/626 |
| 6,270,007 B1 | * | 8/2001 | Jensen, Jr. ............. 229/122.21 |

FOREIGN PATENT DOCUMENTS

| DE | 27 40 262 | 3/1979 |
| DE | 39 26 650 | 2/1991 |
| DE | 40 00 186 | 7/1991 |
| DE | 43 39 445 | 5/1995 |
| DE | 299 11 935 | 10/1999 |
| GB | 699100 | 10/1953 |
| GB | 825943 | 12/1959 |
| WO | WO 99/55603 | 11/1999 |
| WO | WO 99/55604 | 11/1999 |
| WO | WO 99/55605 | 11/1999 |

* cited by examiner

Primary Examiner—Rinaldi I. Rada
Assistant Examiner—Hemant M. Desai
(74) Attorney, Agent, or Firm—McGlew and Tuttle, P.C.

(57) ABSTRACT

A bottle treatment and conveying method and a bottle treatment installation is provided with a bottle producer or other bottle feed (2). At least one bottle transfer device (4) is provided as well as a plurality of trays (5) for the bottles, a transport device (11), optionally at least one discharge or loading station, preferably a said palletizing unit (22), and at least one treatment station (15). The bottles (26, 30) are transported in one or more said tray stacks (27) formed by said stackable trays (5), which have said closed side walls (24) and tightly surround the said bottles (26, 30), sealingly on all sides. The box-shaped trays (5) are stacked on top of each other for transportation, the trays in the stack sealingly closing each other and the top tray being sealed with a lid (31). The trays are separated at the treatment stations (15) and then restacked after the bottle treatment.

20 Claims, 6 Drawing Sheets

INSTALLATION FOR TREATING BOTTLES

FIELD OF THE INVENTION

The present invention pertains to a bottle handling plant with the features described in the preamble of the principal claim.

BACKGROUND OF THE INVENTION

Such a bottle handling plant has been known from WO 99/55604. It comprises at least one bottle producer, to which at least one bottle transfer unit is connected, which transfers the bottles produced onto individual trays or intermediate carriers, which can then be conveyed with a conveying means to a handling station, e.g., a filling plant or a palletizing unit or the like. A storage facility for the intermediate buffering of the empty trays or the trays loaded with bottles may be connected to the conveying means. The trays are conveyed individually on the conveying means in this prior-art bottle handling plant.

SUMMARY AND OBJECTS OF THE INVENTION

The object of the present invention is to provide a further improved bottle handling plant.

According to the invention a bottle handling plant for handling and especially conveying bottles is provided with a bottle feed means such as a bottle producer or other a bottle source and at least one bottle transfer unit as well as a plurality of trays for the bottles. A conveyor and optionally at least one discharge or loading station and preferably a palletizing unit and at least one handling station are provided. The bottles are conveyed to the discharge or loading station within the plant and/or to the handling station or handling stations located within the plant in one or more tray stacks. The tray stacks are formed by stackable trays which have said closed side walls and tightly surround the bottles.

In the bottle handling plant, the trays are designed as stackable containers, which tightly and protectively surround the bottles. In the tray stacks stacked up, the trays can be conveyed on a corresponding conveying means within the plant and they can also transported over land. Plastic bottles, especially PET bottles, can be produced as a result in a central area with high production capacities and they can be conveyed in the tray stack in a protected manner and with small space requirement to the handling stations as well as to a stack storage facility within the plant, or they can be transported to external handling stations located at a greater distance. The bottles are accommodated in the tray stack in a protected manner and hygienically during the conveying and transport. In most cases, they do not require any additional protective measures, which also applies to the overland transport, i.e., transportation to points outside the plant and possibly over greater distances.

The stackable trays increase the capacity and the throughput of the bottle handling plant. Due to stacks being formed, the length of the conveying means can be reduced despite the high bottle throughput. In addition, the use of parallel main and secondary sections and of main and secondary sections connected with switches at the conveying means is advantageous for tying in the bottle transfer unit and the other handling stations. Jams at the loading and unloading points are avoided as a result.

The bottle producers and the handling stations are preferably connected to the conveying means via a tray circulation each. The trays are stacked up and unstacked at the bottle transfer unit in the tray circulation. The trays can thus be loaded and unloaded very rapidly.

The tray stacks can be conveyed directly by means of the conveying means to the handling stations, especially a filling plant, etc. As an alternative or in addition, it is also possible to tie in an intermediate storage facility, in which the trays are stored in the stack. Buffering and equalization of the capacities between the bottle producers producing over a rather long period of time and the handling stations operating more rapidly, especially filling plants, takes place via the intermediate storage facility.

Due to the suitable design of their side walls and their bottoms, the trays can be stacked directly one on top of another with a mutual positive-locking guiding. The positive-locking guiding is one of the possibilities of tightly surrounding and enclosing the bottles. An empty tray or a special cover may be put on for the upper tight closure of the tray stack.

The trays and the bottle handling plant are suitable for bottles of different types and sizes. Larger bottles can be transferred by the bottle transfer unit in the upright position in the manner known from WO 99/55605 and ordered to form one layer on the trays. As an alternative, small bottles, which are less suitable for an ordered transfer, can be filled by the bottle transfer unit randomly like bulk goods into corresponding suitable trays. The small bottles can also be stored intermediately in this layer, in which case they are removed from the trays by another bottle transfer unit before filling or another handling operation in a suitable manner and put up and ordered in a layer that is suitable for handling.

The present invention makes possible the better and more gentle handling of the relatively sensitive small PET bottles compared with the state of the art. The filling of the bottles into large silos, which has hitherto been usual, can be avoided. The smaller trays also have the advantage that the small bottles in the lower layers are not deformed and squashed by the own weight of the bottles weighing on them. Intermediate storage in smaller drums and trays is, in addition, more favorable for the further handling and especially the filling of the bottles. Moreover, the long conveyor belts for connecting silos and filling plants, which were usually used hitherto and are expensive to build, can be eliminated with the bottle handling plant according to the present invention and the standardized tray transport.

The bottle handling plant according to the present invention is, moreover, substantially more flexible than prior-art plants. Besides the higher capacity, it also offers the advantage of greater diversification. Completely different types of bottles and bottle formats can be produced or introduced and intermediately stored or filled or handled in other ways within one plant. In particular, the particular amounts of the different bottles can also be set and handled as desired in this case.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
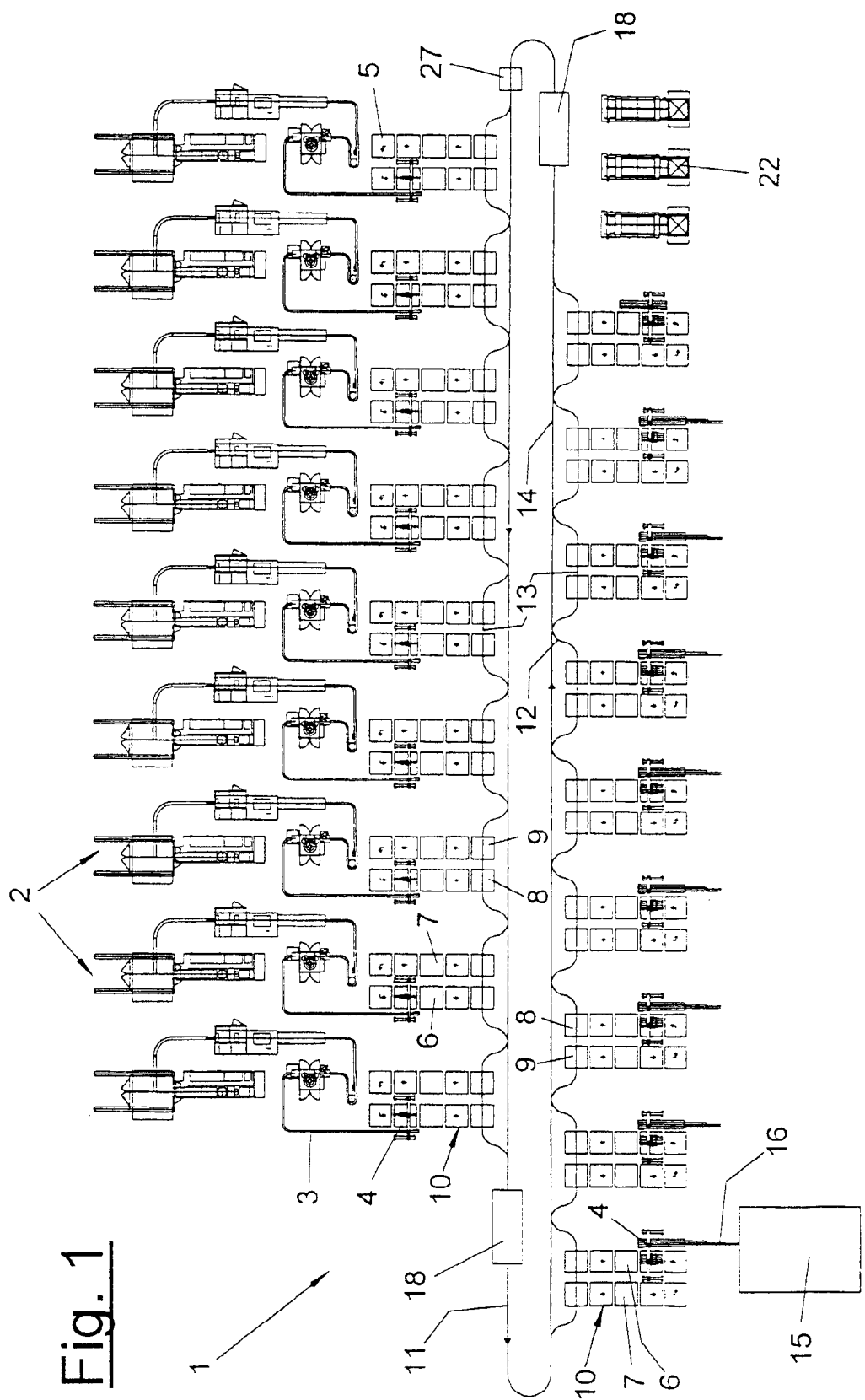
FIG. 1 is a top view of the bottle handling plant with a plurality of bottle producers, a conveying means for tray stacks and a plurality of handling stations.

Referring to the drawings in particular, FIG. 1 shows a schematic drawing of a bottle handling plant 1, which has one or more bottle producers 2 as a bottle feed means, at least one conveying means 11 and one or more handling stations 15. In addition, at least one storage facility 17 can be connected to the bottle handling plant 1.

The bottle producers 2 may have any desired, suitable design. In the exemplary embodiment being shown, they are blowing machines for PET plastic bottles, which may be followed, if needed, by additional devices, e.g., a deburring means, not shown specifically, and a leakage testing device. At the end of the bottle producers 2, the bottles 26, 30 arrive from a discharge line 3, which may have any desired, suitable design, e.g., it may be a pneumatic conveyor.

As an alternative a bottle feed means may be provided that takes up new or used and recycled bottles 26, 30 made of plastic, glass or other materials, which are fed on pallets or in another way, they optionally unpack the bottles 26, 30 and guide them onto the discharge line 3.

In the embodiment being shown, the handling stations 15 comprise filling plants with checking and labeling means, optionally washing means and a downstream packaging means. For example, the palletizing units 22 shown in FIG. 1 may be connected on the output side to the processing stations 15. However, the palletizing units 22 may also act as handling stations 15 and be likewise connected to the conveying means 11. Furthermore, they may have a packing means, e.g., a so-called film bagging machine.

Figure 3:
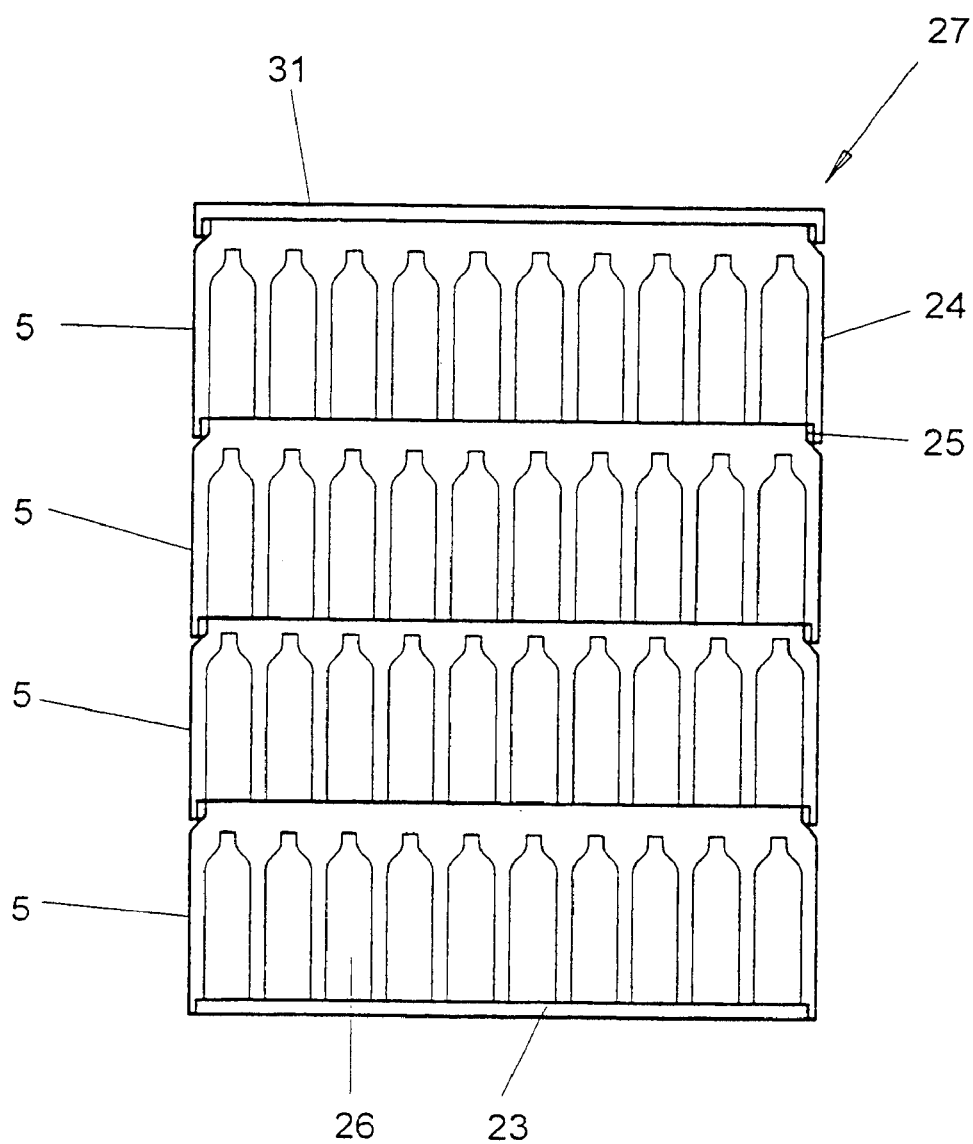
FIG. 3 is a broken-away side view of a tray stack.
Figure 5:
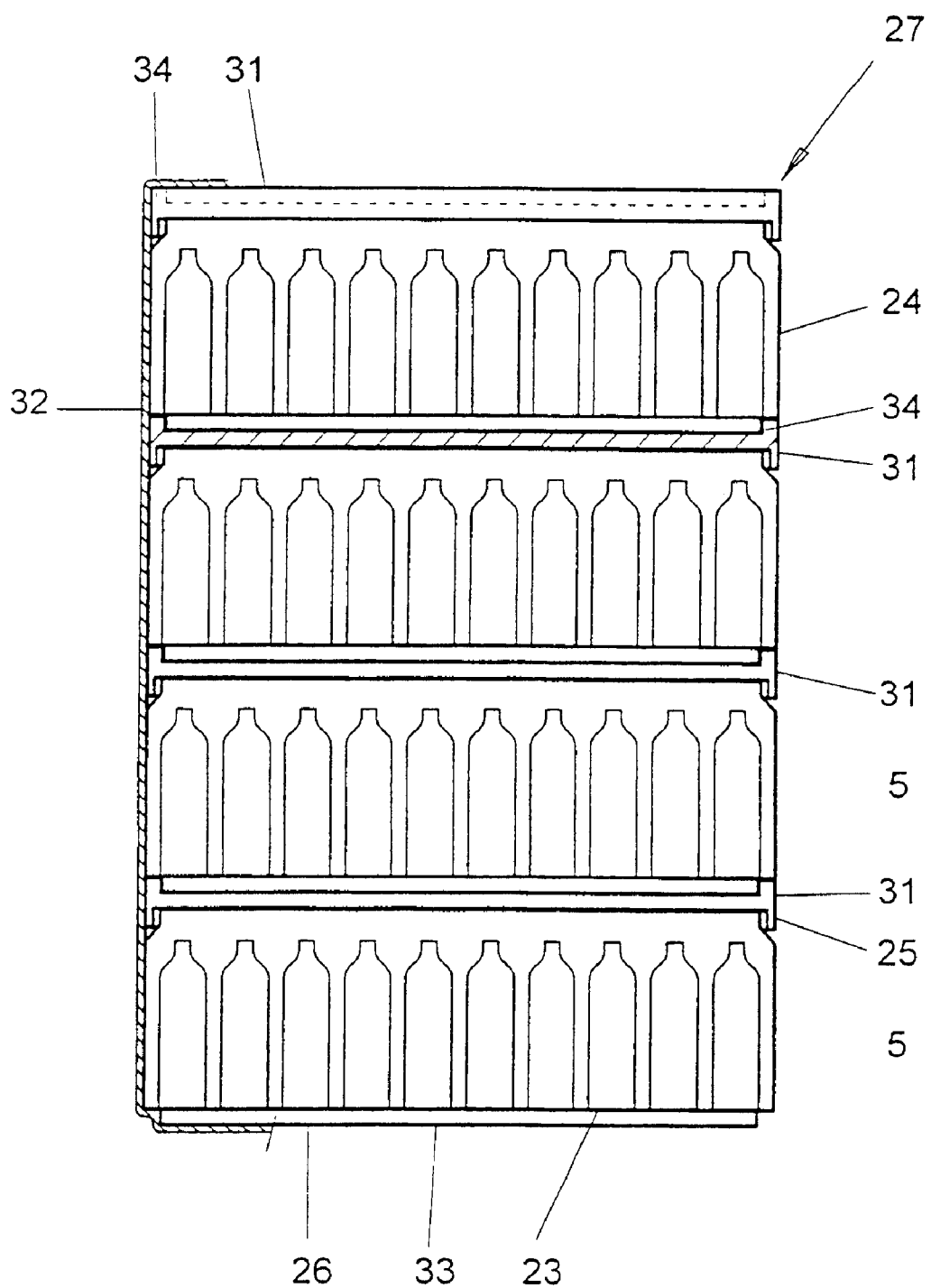
FIG. 5 is another variant of the tray stacks according to FIG. 3.

In one embodiment according to FIGS. 3 and 5, the individual bottles 26 are assembled on trays or intermediate carriers 5, forming upright bottle layers. These are larger bottles, which are independent and are able to stand upright. The trays 5 are preferably approximately as tall as the bottles 26 or taller. They form containers, which surround the bottles with closed walls at the bottom 23 and on the sides.

Figure 4:
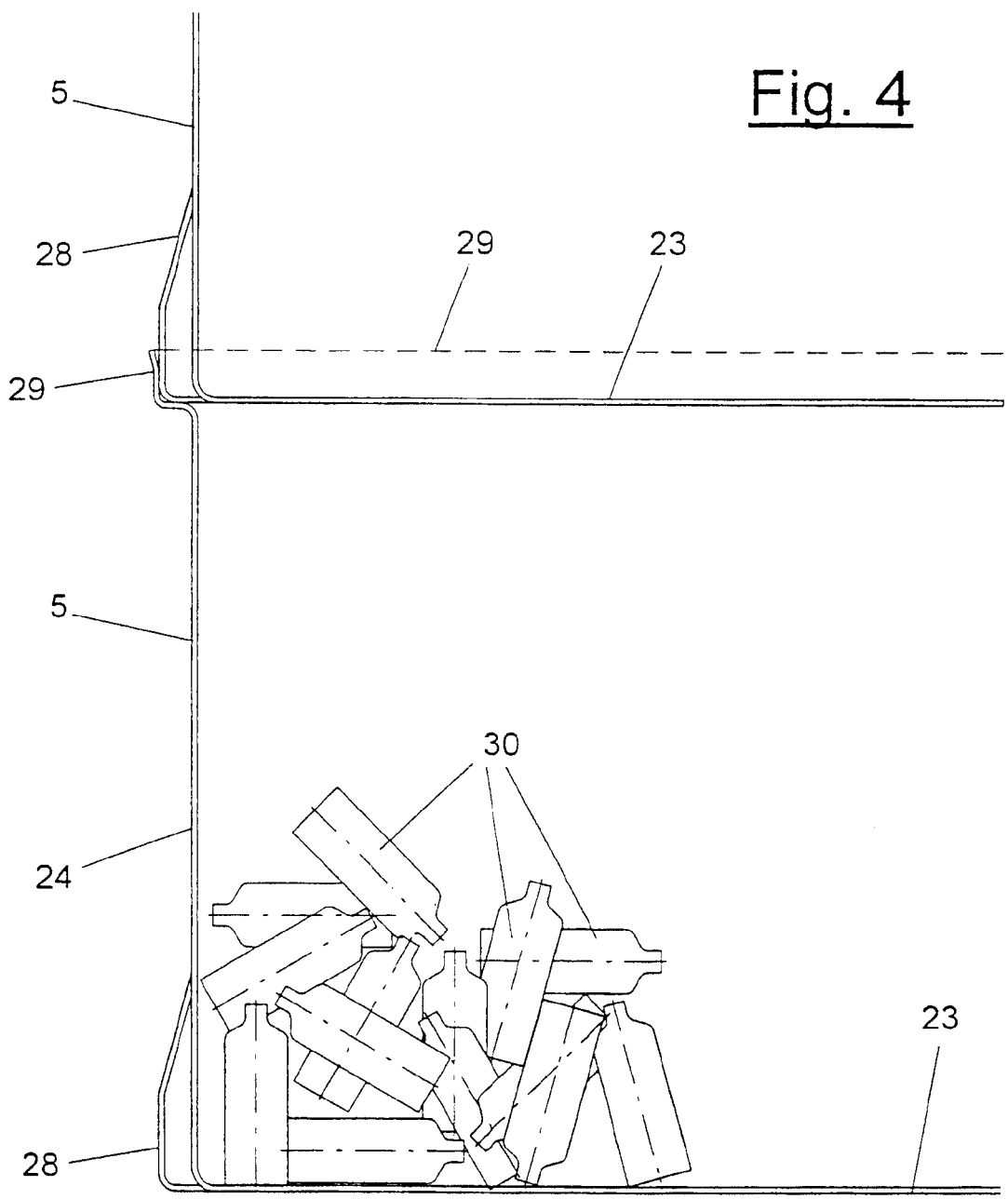
FIG. 4 is a variant of the trays for small bottles.

In the variant according to FIG. 4, smaller and more labile bottles 30 are filled into the trays 5 in a random layer and similarly to bulk goods. The bottles 30 have a volume of, e.g., 0.1 or 0.2 L. The trays 5 have a greater height here than the bottles 30 and are designed as boxes or containers. The height of the tray depends on the stability, especially the resistance to deformation of the bottles 30. The height of the tray or also the pile height is selected to be only just enough to prevent the bottles 30 lying at the bottom from being squashed or unacceptably deformed by the weight of the bottles 30 lying over them.

Tray stacks 27 are formed from the trays 5 for the transport. Stacking and unstacking takes place in a suitable manner at the bottle producers 2 and the handling stations 15. The stack height may have any desired, suitable value and amount, e.g., up to about 2 m.

Tray circulations 10, in which the trays 5 circulate, are associated with the bottle producers 2 and the handling stations 15. The tray circulations 10 contain a bottle transfer unit 4 each, which loads or unloads the trays 5 with the bottles 26, 30. The bottle transfer unit 4 may have any desired, suitable design for this.

In a preferred embodiment for the larger bottles 26, the bottle transfer unit 4 has a design with a multiaxially and preferably essentially linearly movable gripping means and with a plurality of laterally adjustable row grippers corresponding to WO 99/55604. As an alternative, it is also possible to use a bent arm robot with a gripping tool. The bottles 26 are transferred in the upright position and grasped one by one for this, e.g., at the neck of the bottle.

In another preferred embodiment for the small bottles 30, the bottle transfer unit 4 used for the loading is designed, e.g., as a shaking means, with which the bottles 30 arriving from the bottle producer 2 are filled or tipped directly into the container-like trays 5 made ready, and the chute may be movable in order to guarantee uniform filling.

The bottle transfer unit 4 used for the unloading has a means for emptying the trays 5, which preferably tilts over the trays 5 and tips the bottles 30 onto the support. A straightening machine or a so-called scrambler subsequently orders the bottles 30 lying randomly in a desired formation and stands them up in a position suitable for filling, while, e.g., one or more regular bottle rows are formed.

The trays 5 are separated at the bottle transfer unit 4 for the loading and unloading operations. A tray stacker 6, which places the individual trays fed in from the bottle transfer unit 4 one on top of another to form a tray stack 27 and stacks them up, is arranged downstream of the bottle transfer unit 4 in the direction of circulation of the tray circulation 10. The tray stack 27 is then moved on to a loading site in the tray circulation 10, at which it can be transferred to the conveying means 11 in the manner described below.

An unloading site 9, at which tray stacks 27 can be fed in by the conveying means 11 and transferred to the tray circulation 10, is located next to the loading site 8 in the tray circulation 10. A tray unstacker 7, which is located in front of the bottle transfer unit 4 in the direction of circulation and which separates the trays 5 from the tray stack 27 fed in for transfer to the bottle transfer units 4, is located downstream of the unloading site 9. The tray circulation 10 has suitable conveying means, e.g., roller conveyors, conveyor belts or the like for conveying the tray stacks 27 or the separated trays 5. The tray stackers 6 and the tray unstackers 7 have suitable grippers and lifting means, with which the trays 5 can be stacked up to form the tray stack 27 and can be removed during the separation. The loading sites 8 and the unloading sites 9 have suitable transfer devices, with which the tray stacks 27 can be transferred from the tray circulation 10 to the conveying means 11 and can again be taken over in the opposite direction.

The bottle producers 2 are connected with their discharge line 3 to the bottle transfer unit 4, which takes up the larger bottles 26 fed in one by one and in a row one after another row by row and transfers them onto the already stopped trays 5, while a complete bottle layer is formed in the trays 5. The small bottles 30 are filled, preferably tipped randomly, into the trays 5 in the above-described manner. The loaded trays 5 are then stacked up by the tray stacker 6 to form full tray stacks 27 and are transferred via the loading site 8 to the conveying means 11.

A reverse operation takes place at the handling stations 15. The tray stacks 27 filled with bottles are fed via the unloading site 9 to the tray unstacker 7, which separates the loaded trays 5 and feeds them to the bottle transfer unit 4. The bottle transfer unit 4 is connected to the input line 16 of the handling station 15. It unloads the trays 5 in the above-described manner and transfers the bottles 26, 30 in an ordered manner, preferably in rows, to the input line 16.

In the embodiment being shown, a separate tray circulation 10, which has a bottle transfer unit 4 each with a tray stacker 6 and with a tray unstacker 7 as well as a loading and unloading site 8, 9, is associated with each bottle producer 2 and with each handling station 15. This number and association of the devices may be changed as desired. Thus, a plurality of bottle producers 2 and/or handling stations 15 may be divided into a common tray circulation 10. The tray circulations 10 may have, moreover, a plurality of bottle transfer units 4), tray stackers and tray unstackers 6, 7 and loading and unloading sites 8, 9, which are arranged in parallel to one another in a suitable manner in this case.

As is illustrated in FIGS. 3 and 5, the bottles 26, 30 in the tray stack 27 are surrounded by the trays 5 tightly and enclosed on all sides. As a result, they are protected from external environmental effects, especially moisture, dust or the like. The protection of the bottles in the tray stack 27 on all sides makes it unnecessary to arrange additional packaging means, e.g., a film packaging means. However, such auxiliary means may nevertheless be present.

The sealed accommodation of the bottles 26, 30 in the tray stack 27 can be achieved in different ways. In the embodiment being shown, the trays 5 have a closed bottom 23 and closed peripheral side walls 24. As a result, the trays 5 acquire the shape of boxes or cases open on one side with, e.g., a rectangular base. The opening of the box is tightly closed by the bottom 23 of the superjacent tray 5. The bottoms 23 and the top edges of the side walls 24 form a suitable peripheral and positive-locking guide 25 for this purpose. In the embodiment shown in FIG. 3, the bottoms 23 have, e.g., a downwardly projecting, peripheral edge, and the side walls 24 have retracted edges on the top side, via which the bottoms 23 engage the tray stack 27 in a positive-locking manner.

In the variant of the positive-locking guide 25 according to FIG. 4, the side walls 24 have at the lower edge an outwardly projecting, strip-like projection or bead 28, which engages a correspondingly bulging support 29 at the top edge of the side walls 24 of the lower tray 5 in a positive-locking manner during stacking. Any other desired designs are also possible instead of the embodiment being shown.

The topmost loaded tray 5 in the tray stack 27 can be closed by a cover 31 put on or by an empty tray 5. If covers 31 are used, suitable handling devices for putting on, removing and storing the covers 28 (not shown) are arranged at the tray circulations 10.

As an alternative, the other trays 5 in the tray stack 27 can also be closed with a cover 31, in which case the cover forms the positive-locking guide 25. FIG. 5 shows this variant, in which, e.g., the tray bottoms 23 have retracted foot parts 33 and the covers 31 have an edge-side peripheral bead 34, which engage one another in a positive-locking manner.

For transport, the tray stacks 27 may be secured with a transport securing means 32, which holds together the tray stack 27. This may be, e.g., the shrink film shown in FIG. 5, which surrounds the tray stack 27 at least on the lateral surfaces and additionally also ensures sealing against external environmental effects. As an alternative, the stack securing means 32 may also be designed as a clamp, as a peripheral strap or in any other suitable manner. In particular, the stack securing means 32 may also be reusable.

Figure 2:
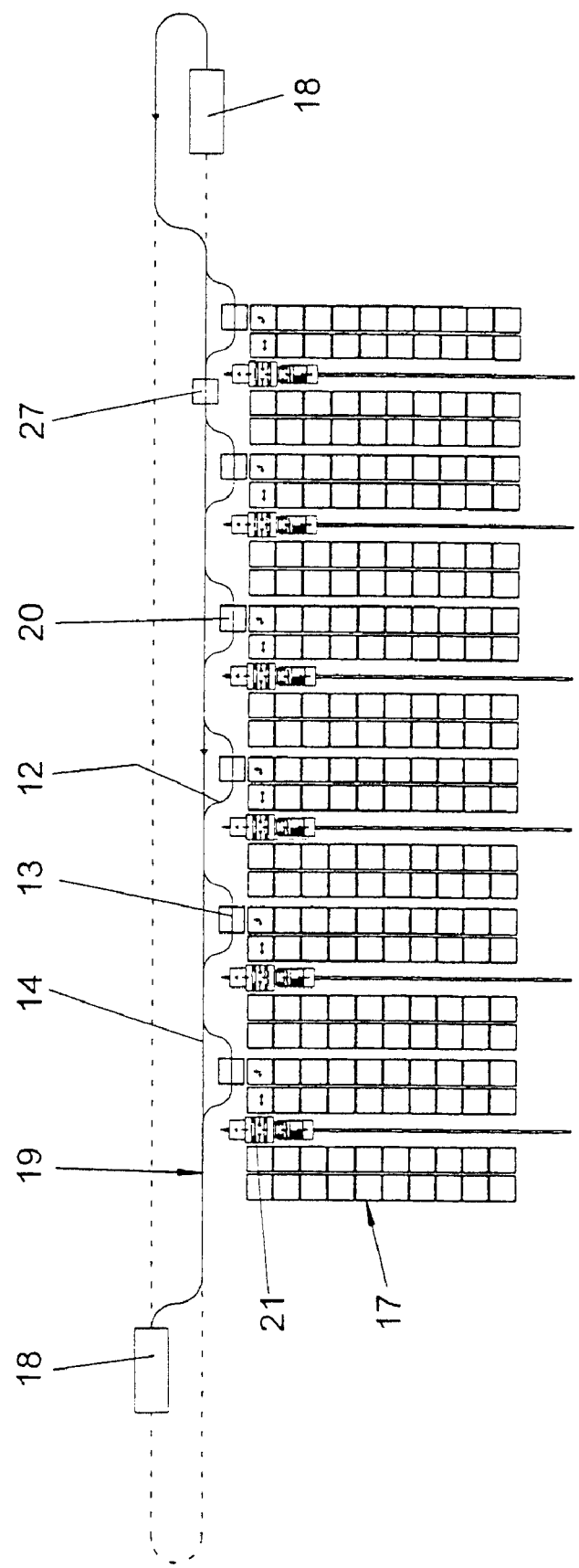
FIG. 2 is a schematic top view of a storage facility for tray stacks, which can be connected to the conveying means of the bottle handling plant according to FIG. 1.

In the embodiment shown in FIGS. 1 and 2, the conveying means or conveyor 11 connects all bottle producers 2 and all handling stations 15, wherein the tray stacks 27 are circulated on suitable conveying means, e.g., roller conveyors, conveyor belts, etc. Depending on the design of the bottle handling plant 1, a plurality of conveying means 11 with corresponding branches and connections may be present as well.

To accelerate the conveying of the stacks, the conveying means 11 has a main section 14 for the continuous and circulating conveying of the tray stacks 27. A plurality of parallel secondary sections 13 are connected to the main section 14 via suitable switches 12. The loading sites 8 and the unloading sites 9 are located at the secondary sections 13. For loading and unloading, the tray stacks 27 are discharged from the main section 14 to the corresponding secondary conveyor section 13. As a result, the loading and unloading operations can take place on the side from the main section 14 in an undisturbed manner. The other tray stacks 27 located on the main section 14 can be conveyed farther past the secondary sections 13 as a result without hindrance and without backup and they can reach their destination. In addition, conveying at different speeds and the setting of priorities for tray stacks 27 are possible due to the secondary sections 13. Tray stacks 27 moving at a higher speed or tray stacks 27 needed sooner can overtake slower tray stacks 27 as a result if these evade on the secondary sections 13.

The storage facility 17 shown in FIG. 2 is used to store filled or empty tray stacks 27. It may be connected to the conveying means 11 in any desired, suitable manner. In the embodiment being shown, the conveying means 11 and the storage facility 17 are located at different levels. The connection is made via two intermediate conveyors 18 at the loop ends of the conveying means 11.

A separate conveying means 19, which is designed for the conveying means 11 and has main and secondary sections 14, 13, is associated with the storage facility 17. The conveying means 19 may be designed as a finite section or as a closed endless loop path (represented by broken lines). It is used to convey the tray stacks 27 to the individual areas of the storage facility.

The storage facility 17 is preferably designed as a high-bay storage area and has a plurality of aisles, in which storage facility material handling equipment 21, here floor-bound high-bay warehouse storage and retrieval equipment, move. Each storage area has a loading and unloading site 20 with a secondary section 13 belonging to it.

In the embodiment being shown, the bottle producers 2 has a lower hourly capacity than the handling stations 15 or filling plants. The bottle producers 2 operate, e.g., in a 24-hour operation, whereas the handling stations 15 or the filling plants are in operation for 12 hours a day only. The bottles produced are stored intermediately with the tray stacks 27 in the storage facility 17 during the downtimes. The stock in the storage facility is again removed at least partially during the filling operation, and tray stacks 27 are fed as a mix to the handling stations 15 or filling plants from the bottle producers 2 and from the storage facility 17. The design of the conveying means 11 and the conveying means 19 with main and secondary sections 14, 13 makes possible the smooth introduction and removal of intermediately stored tray stacks 27.

The small bottles 30 are produced by the bottle producers 2 in especially large numbers and at a high pace and are filled into the trays or containers by the associated bottle transfer unit 4. These small bottles 30 may likewise be stored first intermediately in a storage facility 17 before the filling operation. However, as an alternative, they may also be sent first to a handling station 15, e.g., a labeling station and optionally also to a checking station. After labeling or checking, they are then again filled into the trays 5 and are subsequently sent to the storage facility 17. Moreover, the small bottles 30 are produced in various colors. In this case, they are stored in the storage facility 17 separated according to type for rapid access. The types are preferably also separated within the tray stacks.

Figure 6:
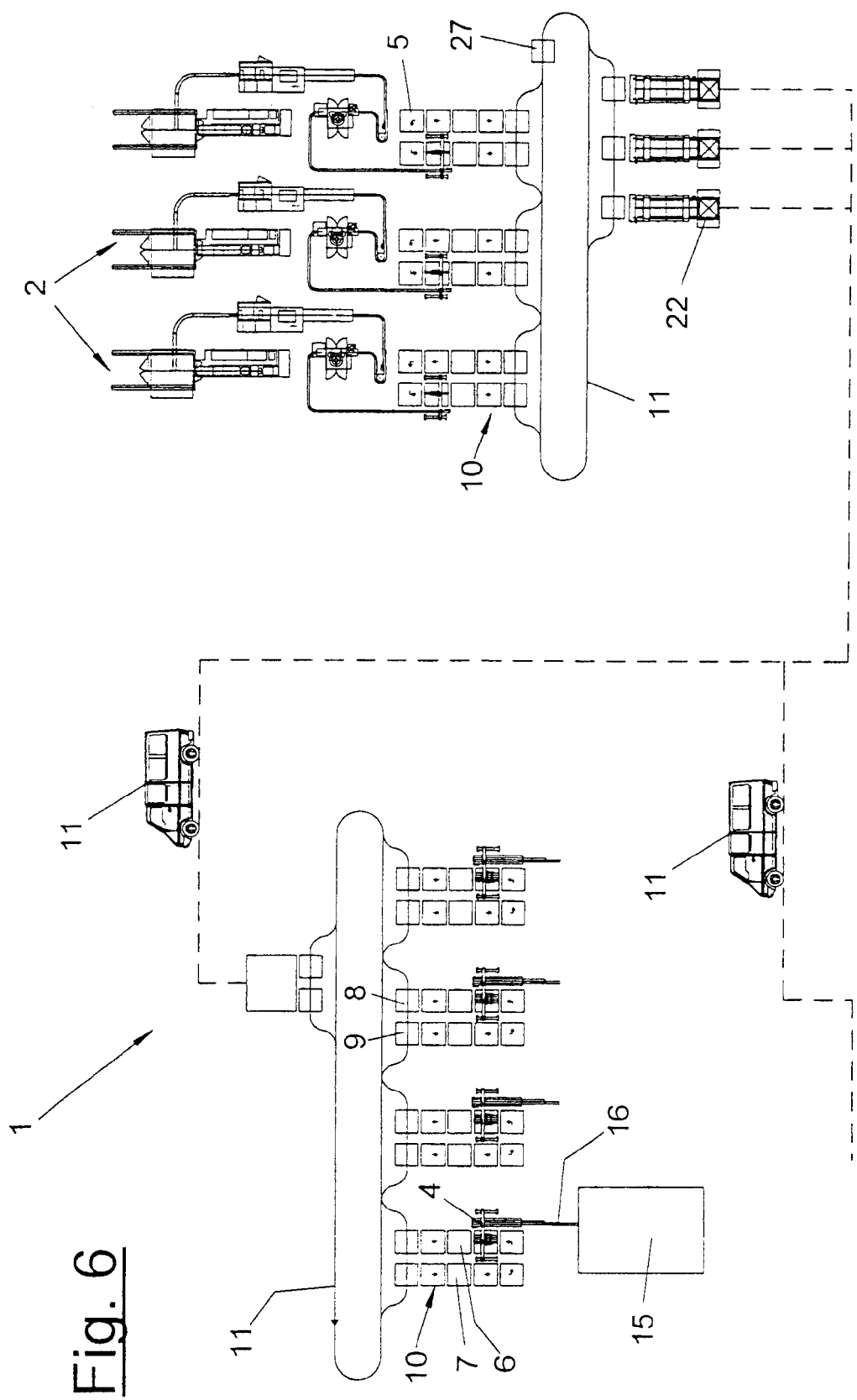
FIG. 6 is a variant of the bottle handling plant according to FIG. 1.

FIG. 6 shows a variant of the bottle handling plant according to FIGS. 1 and 2. In the embodiment according to FIG. 6, the bottle producers 2 or the bottle feed means are arranged separated in space from the handling stations 15. The bottle producers 2 may form, e.g., a central production center here, which supplies a plurality of external filling plants 15 distributed at various locations. The bottles 26, 30 are filled at the production center into the trays 5 in the above-described manner and are then brought in tray stacks 27 to the palletizing unit 22 or film bagging machines. These may also be discharge and loading stations of a completely different design. The tray stacks 27 are loaded at these on suitable conveying means 11, e.g., road vehicles and transported on these over land to the other external parts of the bottle handling plant 1. Depending on the distance, this transport may also be at least partially air transport or water transport. At the external parts of the handling plant 1, the tray stacks 27 are then unloaded and brought to the handling stations 15 via a conveying means 11 present there in a suitable manner. Unstacking and optionally also repeated stacking again take place now at suitable sites.

The trays 5 are designed as reusable packagings and may be returned as empties to the bottle production center. As an alternative, the trays 5 may, however, also be transported with the filled bottles to the retail outlets and to the end users, from where they are returned as empties to a recycling plant and back to the bottle feed means.

Various modifications of the embodiment being shown are possible. The technical components of the bottle handling plant 1 may have any desired design. This applies to both the machines and the trays 5. The mutual arrangement and association of the components of the plant may vary. For example, additional components, e.g., checking stations or the like, may be arranged in the discharge line 3 between the bottle producers 2 and the bottle transfer units 4.

Furthermore, the storage facility 17 may also be associated with the bottle producers, which is especially advantageous for a production center with other external parts of the bottle handling plant 1 which are arranged at a distance in space. As an alternative, a separate storage facility 17 may likewise also be eliminated. Furthermore, the storage facility 17 may have any other design. The bottle handling plant 1 being shown is designed for high production and filling capacities. It may also be correspondingly scaled down or diversified. As a variant of the above-described exemplary embodiments, a mixture of the embodiments according to FIGS. 1 and 6 is also possible, in which case the bottle producers 2 according to FIG. 1 have excess capacity or are designed as a production center and also supply other external filling plants by truck transport or the like besides the connected filling plants of their own.

While specific embodiments of the invention have been shown and described in detail to illustrate the application of the principles of the invention, it will be understood that the invention may be embodied otherwise without departing from such principles.

What is claimed is:

1. A process for handling and conveying bottles in a bottle handling plant with at least one bottle producer or bottle feed means, at least one bottle transfer unit with an associated tray stacker, a plurality of trays for the bottles, a conveying means and at least one said handing station, process comprising the steps of:
    providing the bottle producer or bottle feed mean at an inlet of the bottle handling plant providing empty bottles;
    providing the bottle transfer unit downstream of the bottle producer or bottle feed means;
    providing the trays as stackable trays which have closed side walls and tightly surround the bottles;
    building up the trays with bottles to form a stack of trays with the tray stacker of the bottle transfer unit using the empty bottles provided by the bottle producer or bottle feed means;
    providing a storage location for storing stacks of trays downstream of the bottle transfer unit;
    conveying the empty bottles to a discharge or loading station within the plant and/or to the handling station or handling stations located within the plant and/or to the storage location in one or more tray stacks formed by stacking the stackable trays with the tray stacker;
    providing a device for removing trays from the stack to the discharge or loading station within the plant and/or to the handling station or handling stations; and
    substantially to storing said one or more stacks of trays conveying a previously stored stacks from the storage location to the discharge or loading station within the plant and/or to the handling station or handling stations located within the plant.

2. A process in accordance with claim 1, wherein said stackable trays in the tray stack are tightly sealed against one another and a topmost tray is closed with a cover.

3. A process in accordance with claim 1, wherein the tray stacks are transported over land from the discharge or loading station to the one or more external handling stations.

4. A process in accordance with claim 3, wherein the tray stack is held for the conveying transport with a stack securing means.

5. A process in accordance with claim 1, wherein said tray stack is first unstacked at the bottle producer or the bottle feed means and at the processing stations and after the performance of the loading or unloading operation is subsequently stacked again at the individual trays with the tray stacker.

6. A bottle handling plant, comprising:
    a bottle producer or a bottle feed means;
    a transfer unit receiving empty bottles from said bottle producer or bottle feed means;
    a plurality of stackable trays for said bottles, transfer unit having a stacker for building up stacks of trays filled with empty bottles;
    a conveying means;
    a storage area; and
    a handling station with an unstacker device for removing trays from a stack of trays filled with empty bottles, said conveying means extending from said transfer unit at an upstream location to said handling station at a downstream location and with said storage area located along said conveying means between said transfer unit and said handling station, said stackable trays for transport within the plant in one or more tray stacks with each tray being a container that can be stacked up on another stackable tray, each stackable tray having closed side walls tightly surrounding a space for the bottles, said conveying means transferring stacks of trays between said transfer unit and said storage area and between said storage area and said handling station.

7. A bottle handling plant in accordance with claim 6, wherein said trays are approximately as tall as or taller than said bottles.

8. A bottle handling plant in accordance with claim 6, wherein at least one of said tray has a removable cover.

9. A bottle handling plant in accordance with claim 6, wherein said stackable trays each have a bottom and the top edges of said side walls with mutual positive-locking guides.

10. A bottle handling plant in accordance with claim 6, wherein each of said tray stacks is held during transport by a stack securing mean.

11. A bottle handling plant in accordance with claim 10, wherein said securing means is shrink wrap film.

12. A bottle handling plant in accordance with claim 6, wherein said tray stacker is arranged downstream of said bottle transfer unit; transferring bottles received from said bottle feed means or the bottle producer and said handling station having said tray unstacker device arranged at said another bottle transfer unit.

13. A bottle handling plant in accordance with claim 12, further comprising a tray circulation is connected to said conveying means via a loading site and an unloading site for said tray stacks.

14. A bottle handling plant in accordance with claim 6, wherein said conveying means is connected to a tray circulation via a loading site and an unloading site for said tray stacks.

15. A bottle handling plant in accordance with claim 6, wherein said handling station has at least one input line connected to a tray circulation via a bottle transfer unit.

16. A bottle handling plant in accordance claim 6, further comprising loading sites and said unloading sites are arranged at a secondary conveying section each secondary conveying section extending in parallel to said main section and being connected to same via switches.

17. A bottle handling plant in accordance with claim 6, wherein said conveying means is connected by at least one intermediate conveyor to a conveying means associated with said storage facility.

18. A bottle handling plant in accordance with claim 6, wherein said storage facility has a loading and unloading site arranged at a secondary conveyor section of said conveying means connected by switches to a main section of said conveying means extending.

19. A bottle handling plant in accordance with claim 6, further comprising: at least one discharge or loading station with a palletizing unit.

20. A bottle handling plant, comprising:

a bottle producer or a bottle feed providing empty bottles at the inlet of the bottle handling plant;

a plurality of stackable trays for said empty bottles with each tray being a container that can be stacked up on another stackable tray, each stackable tray having closed side walls tightly surrounding a space for the empty bottles;

a transfer unit receiving empty bottles from said bottle producer or bottle feed means and disposing said empty bottles in trays and including a tray stacker for building up stacks of trays filled with empty bottles;

a handling station with an unstacker device for removing trays from a stack of trays filled with empty bottles;

a storage area disposed adjacent to said conveyor for receiving and storing stacks of trays;

a conveyor extending from said transfer unit at an upstream location to said handling station at a downstream location and with said storage area located along said conveying means between said transfer unit and said handling station, said conveying means transferring stacks of trays between said transfer unit and said storage area and between said storage area and said handing station.

* * * * *